Feb. 10, 1970
L. H. CHENAULT
3,494,416
HEATING TOOL FOR MAKING FUSED JOINTS IN
TUBULAR THERMOPLASTIC PARTS
Filed Dec. 23, 1968
4 Sheets-Sheet 1
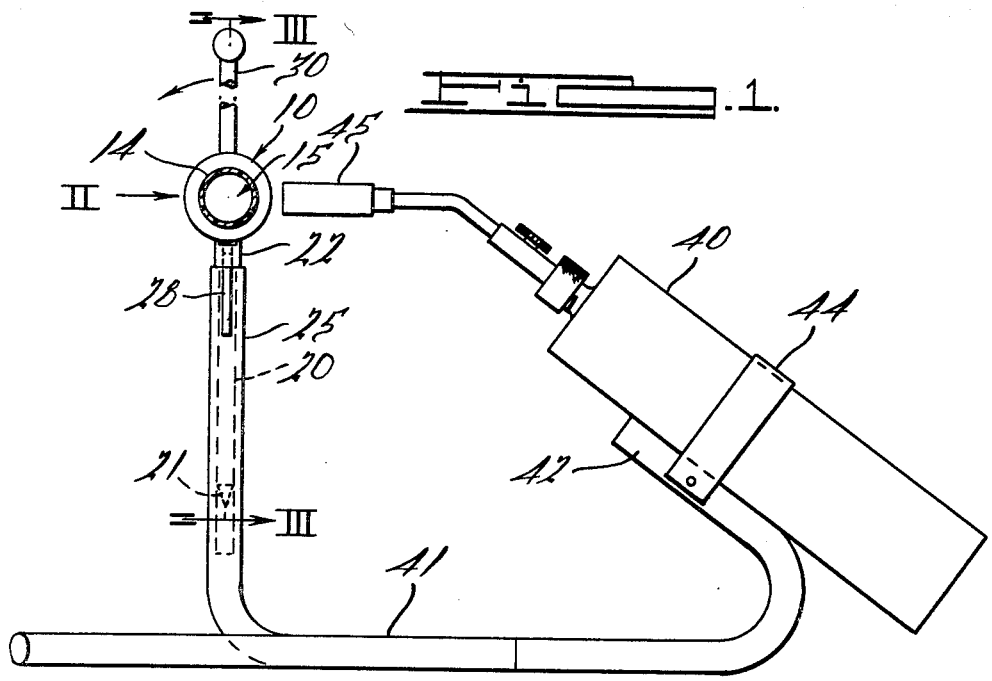
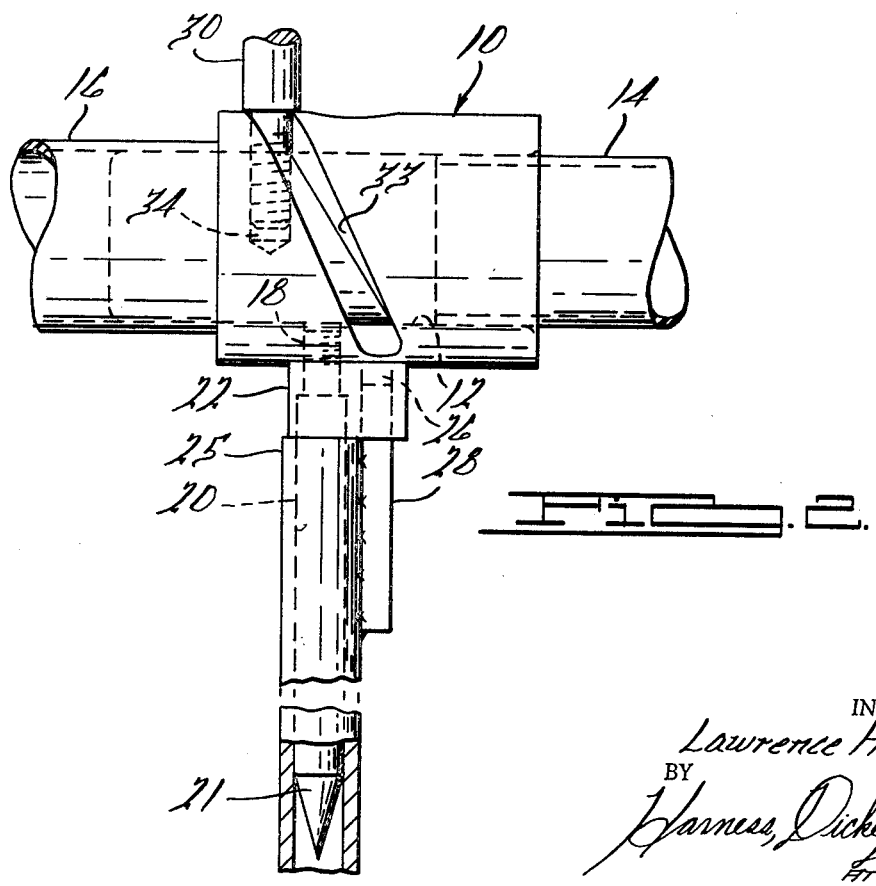
INVENTOR.
Lawrence H. Chenault
BY
Harness, Dickey & Pierce
ATTORNEYS.

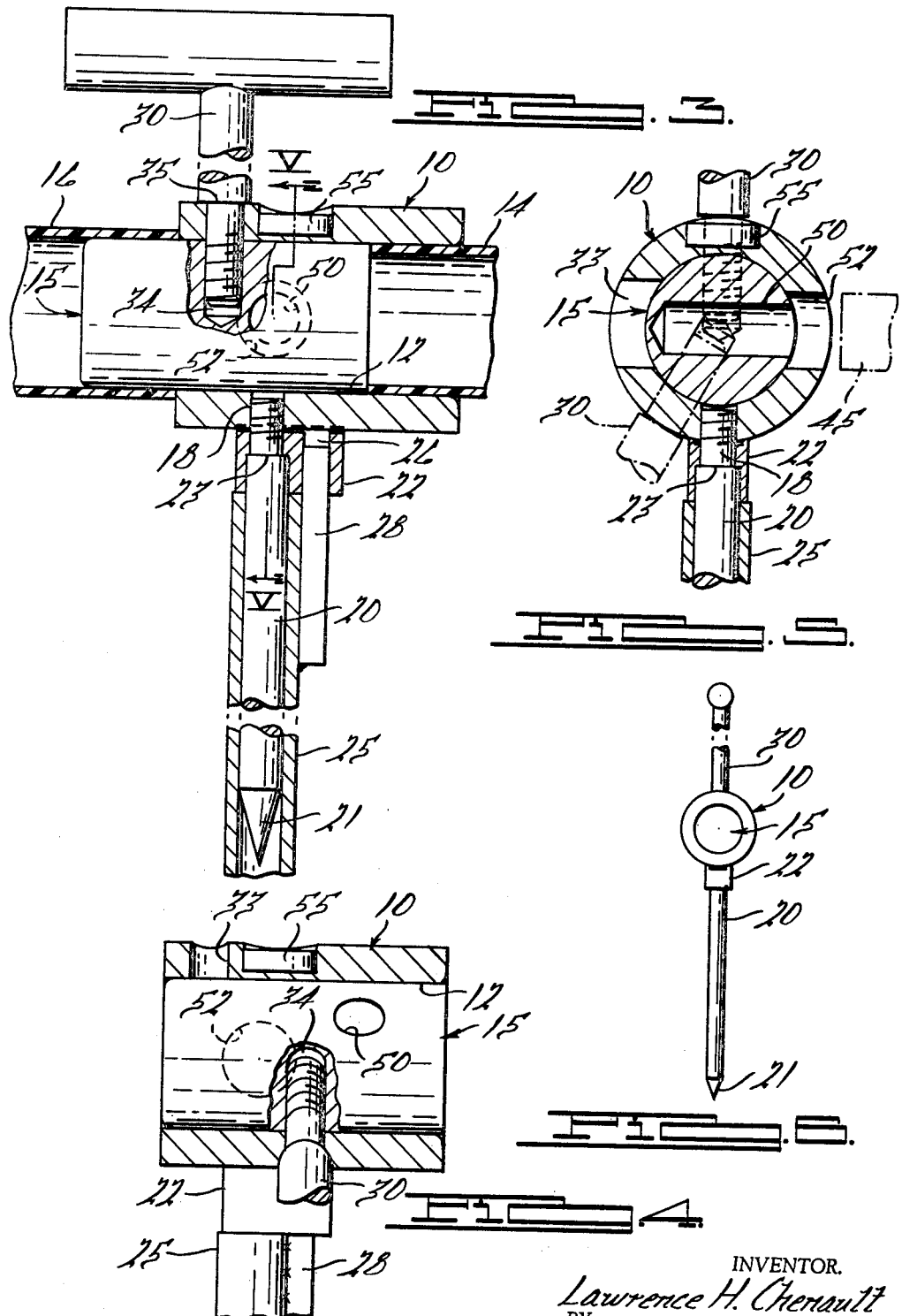

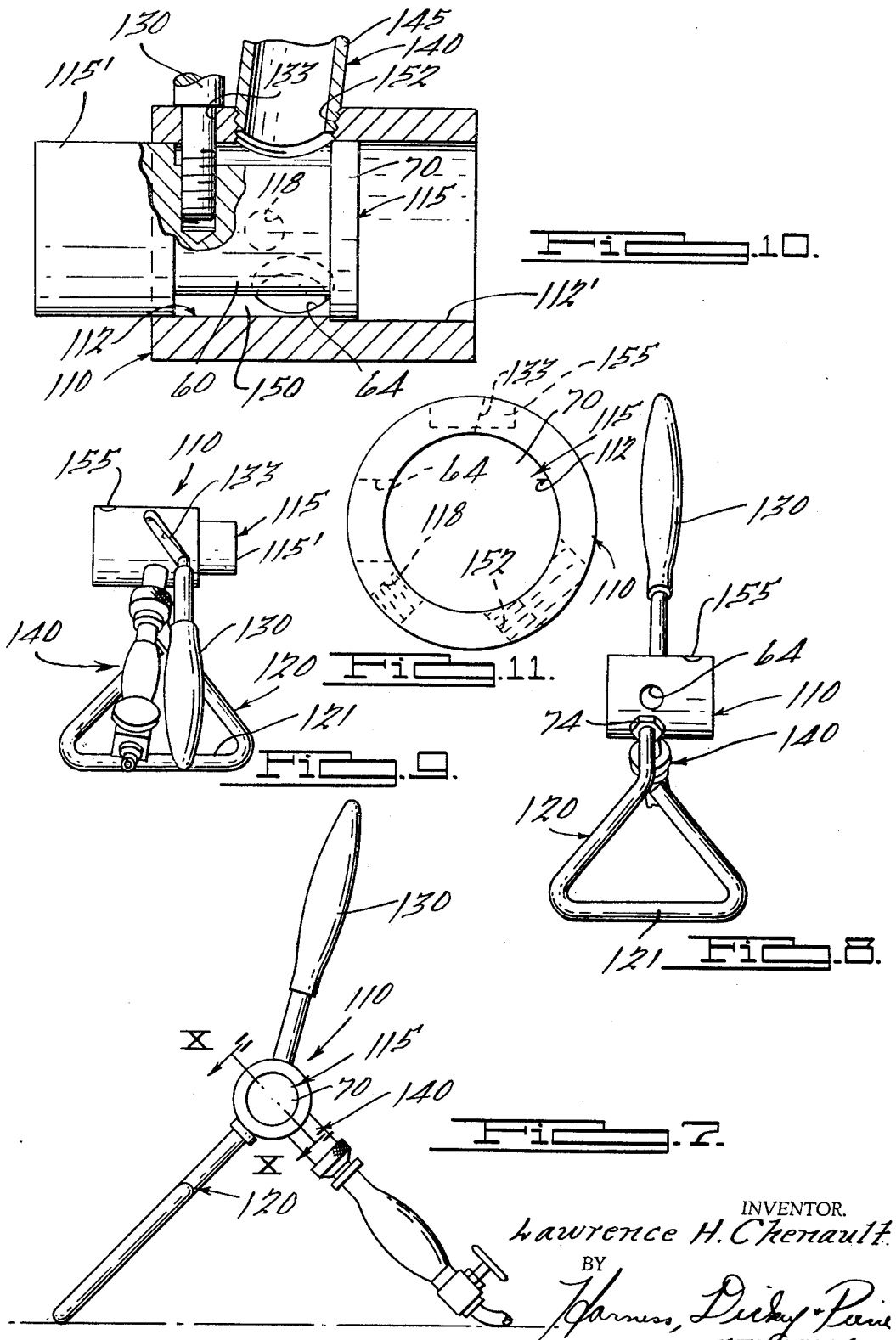

Feb. 10, 1970     L. H. CHENAULT     3,494,416
HEATING TOOL FOR MAKING FUSED JOINTS IN
TUBULAR THERMOPLASTIC PARTS
Filed Dec. 23, 1968     4 Sheets-Sheet 4
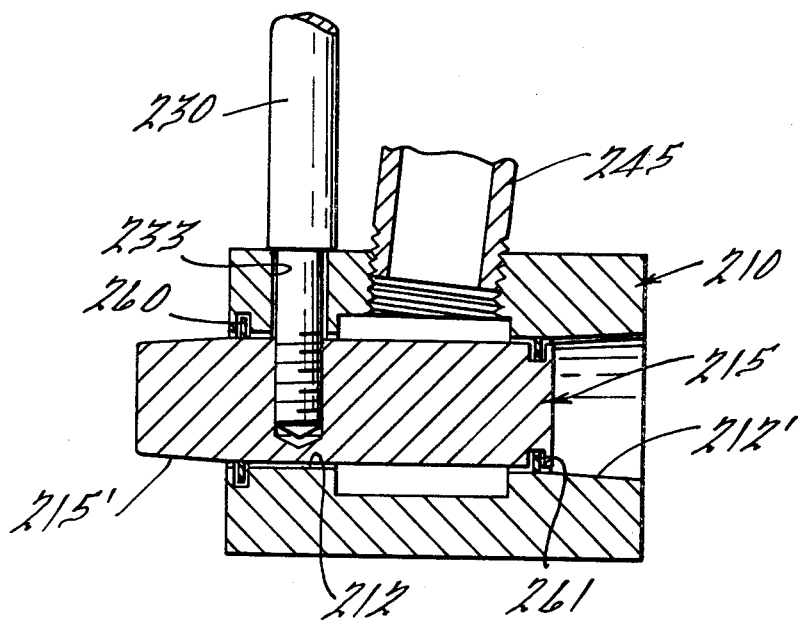
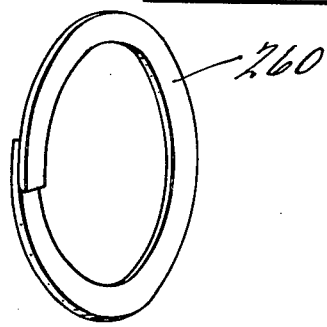
INVENTOR.
Lawrence H. Chenault
BY
Harness, Dickey & Pierce
ATTORNEYS.

United States Patent Office 3,494,416
Patented Feb. 10, 1970

3,494,416
HEATING TOOL FOR MAKING FUSED JOINTS IN TUBULAR THERMOPLASTIC PARTS
Lawrence H. Chenault, 3840 W. 13 Mile Road, Royal Oak, Mich. 48072
Continuation-in-part of application Ser. No. 721,545, Mar. 26, 1968, which is a continuation-in-part of application Ser. No. 588,860, Oct. 24, 1966. This application Dec. 23, 1968, Ser. No. 787,306
Int. Cl. F28f 9/00, 19/00
U.S. Cl. 165—94     15 Claims

ABSTRACT OF THE DISCLOSURE

A tool for heating the overlappable ends of thermoplastic pipe, fittings, etc., to enable heat-sealed joining thereof, has telescopically interfitted plug and socket parts which are used in a heated condition wherein they are partially interfitted but project in opposite axial directions to receive male and female plastic parts to be heated. After the work is removed the plug and socket parts of the tool are slidable to a fully interfitted relation whereby the plug scrapes and pushes from the socket part any material remaining therein and at the same time the surface of the plug part is cleaned off by the opposite end of the socket part. In one embodiment the work-receiving socket area and the socket cleaning portion of the plug part are slightly larger than the work-receiving plug area, to provide a close or interference fit between parts to be joined. In said embodiment the plug part has a reduced portion within the body to provide a heating chamber.

CROSS REFERENCE

The present application is a continuation-in-part of my previously filed copending application Ser. No. 721,545, filed Mar. 26, 1968, and now abandoned, which was a continuation-in-part of my earlier application Ser. No. 588,860, filed Oct. 24, 1966, and now abandoned.

BACKGROUND OF THE INVENTION

The present invention relates to heating tools for use in the formation of fused joints in thermoplastic parts.

A common method of making fluid-tight joints in thermoplastic pipe and fittings involves softening by means of heating the surfaces to be joined and then pressing them together while the surfaces are still molten, so that upon allowing them to cool they are effectively integrated. The objects of the present invention may be summarized as comprising the provision of an improved tool for simultaneously heating both of the two parts of a pair of elements to be joined, the tool being so designed as to be readily adaptable to pipe and fittings of different diameters, easily portable, convenient to use and incorporating a self-cleaning feature by means of which accumulations of melted thermoplastic can quickly be removed from the working surfaces. A further object is to provide such a tool which, because of the indicated advantages and other advantages which will become apparent upon consideration of the present disclosure in its entirety, enables the formation of uniformly high quality joints more rapidly than has heretofore been possible with a tool of comparable simplicity and portability.

BRIEF DESCRIPTION OF THE FIGURES OF THE DRAWING

FIGURE 1 is a side elevational view of a tool constructed in accordance with the present invention, showing the same mounted in a supporting stand and illustrating a coacting heat source;

FIGURE 2 is a front elevational view of the tool, partly broken away, and on a somewhat larger scale, looking in the direction indicated by the arrow designated II in FIGURE 1;

FIGURE 3 is a vertical sectional view taken substantially on the line III—III of FIGURE 1 and looking in the direction of the arrows.

FIGURE 4 is a view of the upper portion of the tool, corresponding generally to FIGURE 3 but with the work removed and the heating parts in the relative positioning they assume during cleaning of the heating surfaces;

FIGURE 5 is a cross section taken substantially on the line V—V of FIGURE 3 and looking in the direction of the arrows;

FIGURE 6 is a side elevational view of the tool removed from the stand;

FIGURE 7 is a side elevation of a modified tool;

FIGURE 8 is a front elevation of the modified tool;

FIGURE 9 is a rear elevation thereof;

FIGURE 10 is a sectional view on a larger scale taken substantially on the line X—X of FIGURE 7 but with the handle in a different position;

FIGURE 11 is an end view of the body of the tool, viewed as in FIGURE 7 but on a larger scale;

FIGURE 12 is a view similar to FIGURE 10 showing another modified construction; and FIGURE 13 is a perspective view of a scraping ring.

DETAILED DESCRIPTION OF PREFERRED FORMS OF THE INVENTION

Referring now to the drawings, although in FIGURE 1 the tool is shown fully assembled and supported in a stand in conjunction with a preferred heating source, the utility of the tool is not confined to any particular heating source or stand construction. The tool per se shown separately in FIGURES 2–6 comprises a tubular body 10 in the form of a hollow cylinder formed of an effective heat conducting and heat resistant material such as bronze. The internal cylindrical opening 12 thereof is dimensioned to accurately receive a tubular workpiece to be externally heated and which is represented in the drawing by a fragmentarily illustrated section of thermoplastic pipe 14.

As shown in FIGURES 3 and 4 the opening 12 extends axially entirely through the body, although the right end portion 12' defines a work-receiving socket. A heating plunger or plug portion 15 which is of the same axial length as the body portion 10 and of the same material, is accurately fitted for rotation and sliding movement in the opening 12 and when in one position, shown in FIGURE 3, a work-receiving plug part 15' thereof projects from one end of the tool a desired distance so as to be adapted to receive thereover, and to heat the internal surface of, a thermoplastic tubular part, such as a fitting, coupling, or the bell end of a thermoplastic pipe which is to be joined in the pipe section 14. The ends of the body and plunger are flat and perpendicular to the axis.

A fitting 16 is shown over the plunger portion 15', in FIGURES 2 and 3, in position to be heated preparatory to the making of a joint. By virtue of the fact that the entire plunger or plug part 15 is of the same axial length as the body portion 10, it will be seen that when the plunger portion is projected to the operative position shown in FIGURE 3, a recess of the same depth defining the work-receiving socket 12' is thereby formed at the opposite end of the tool, for heating the outside of the workpiece 14.

The body is adapted to be supported by a metallic rod 20, the upper end of which is threaded and held in a suitably tapped opening 18 in the bottom of the body 10, while the lower end of the supporting rod is sharpened as indicated at 21 to form a stake which may be driven into the ground to support the tool in working position when desired.

A spacer and locating block 22 is fastened to the bottom of the tool body by means of the stake 20, which is shouldered as indicated at 23 near its upper end to retain the block 22. The thickness of the block in a direction parallel to the axis of the stake is such as to support the tool at a desired elevation on a supporting tubular stand portion 25 into which the stake slidably fits. At such time a laterally spaced downwardly opening locating hole 26 in the block 22 telescopically fits over a locating pin 28 fast upon and projecting upwardly from one side of the tubular stand portion 25 to hold the body against rotation around the axis of the stake. The stand includes a base portion adapted to rest upon a supporting surface and an upturned holding portion 42 to which a heating torch such as the small tank-type LP torch 40 is adapted to be fastened.

A handle 30 secured as by threading into a tapped hole 34 in the plunger 15 and extending radially therefrom projects through and outwardly from a helical cam slot 33 in the wall of the body 10. The positioning, pitch and axial length of the cam slot 33 are such that when the handle extends upwardly from the body 10 the stem of the handle abuts one end of the cam slot, and the plunger portion 15' is at such time fully projected. When the handle is swung downwardly to the position at the other end of the slot as shown in FIGURE 4, and in broken lines in FIGURE 5, the plunger portion 15' moves inwardly and both ends of the plug part 15 are flush with the ends of the body. During such movement the right end of the plug part cleans and pushes from the socket part 12 any material which has adhered to the interior of the latter, while at the same time any material which has adhered to the exterior of the projecting work-receiving plug part 15' is dislodged therefrom as the left end of the body then scrapes the entire exterior of the operative portion 15'. If any of the material so dislodged tends to stick to the ends it is very easily wiped or brushed off of the flush end surfaces of the body and plunger while the latter is in such position.

The stem portion of the handle 30 is provided with an external shoulder 35 which is adapted to be forced against the exterior of the body 10 by rotation of the handle in a direction to screw it into the plunger, in order to lock the plunger in position. By partially unscrewing the handle the parts are freed to permit telescopic movement of the plug by swinging the handle in the manner indicated to selectively retract and re-project the plunger.

Although any siutable heat source may be employed, the tool is designed in such manner as to be conveniently heatable by an external heat source such as a blow torch or LP gas torch. When used on a turf or dirt surface with the stake alone, the stake may simply be pushed into the ground far enough to align the body 10 with the flame of a torch. As best shown in FIGURE 1, the base portion 41 of the stand is adapted to rest on the supporting surface to support the tool when the latter is in the stand, and the parts of the stand are proportioned to support a commercial type of torch so that its play against the side of the body, preferably in the general area which corresponds to the center of mass of the body and plunger when the latter is projected.

It will be appreciated that the body and plunger portions are manufactured in sizes corresponding to the standard pipe fitting dimensions, and that these may range from a fraction of an inch to several inches in diameter. The vertical dimension of the spacer block 22 used with each size tool is such that when placed in the stand, the axis of the body is in line with the center line of the flame from the torch.

With tools of the larger sizes it is advantageous to provide a recess or pocket 50 in the plunger 15, and an opening 52 in the wall of the body 10, the pocket 50 and opening 52 being so positioned that when the plunger is in the projected operative position the pocket and opening are axially aligned with the center line of the flame from the flame shield 45 of the troch.

As shown in FIGURES 3, 4 and 5, an upper portion of the body 10 of the tool may also be recessed to receive a thermometer assembly 55, to provide the user with a convenient indication as to whether or not the tool is at working temperature.

In the modified construction shown in FIGURES 7–11, an internal combustion and heating chamber 150 is provided which extends entirely around the plunger 115. Such chamber is shown as formed by reducing the diameter of a intermediate portion 60 of the plunger but of course could be formed by reducing the thickness of a corresponding portion of the wall of the sleeve, or by reducing both in the desired area to form the chamber. Thus the flame and heated gases may flow entirely around the internal walls of the plunger and sleeve, and to the outlet opening 64, which extends through the wall of the sleeve at a position remote from the inlet defined by the torch connection. This will be seen to promote efficient heating of the plug and socket parts 115', 112'. Many parts of this embodiment will be recognized as analogous to those of the first embodiment and to require no detailed redescription. Reference characters corresponding but one hundred integers higher are employed. The heating torch 140 has its shield 145 directly and rigidly but removably secured as by a threaded connection to an opening 152 in the wall of body 110. The handle of the torch forms a convenient handle for the tool itself.

The work-receiving socket area 112' in the right end of the body sleeve is preferably slightly larger in diameter than the work-receiving plug part 115' at the opposite end of the plunger 115, the difference (exaggerated in the drawings) being such as to permit providing a desired fit, which may be an interference fit (e.g., .002 inch), between the parts to be joined. The right hand end portion 70 of the plunger is of a diameter to fit relatively accurately and slidably in the enlarged socket portion 112' so that when the plunger is moved to retract the plug part its section 170 moves toward and to the mouth of the socket part and acts as a cleanout member to scrape and push from the interior of the socket any material accumulated or stuck to the wall.

The actuating handle 130 for the plunger is approximately the same length as the torch assembly 140. The position of the cam slot 133 is such that when the plug part is fully projected to its opeartive position with respect to the body 110, the handle 130 projects in the same general direction as and substantially parallel to the torch, while when the plug is fully retracted the handle extends upwardly and at approximately 120° to the torch, as shown in FIGURE 7. The body 110 is also provided with a tapped hole 118 for a stand 120 comprised of a single length of heavy wire or rod having an open triangular lower part, a straight base section wire or rod having an open triangular lower part, a straight base section 121 adapted to rest on the ground, and a threaded upper extremity adapted to threadedly fit into the tapped opening 118. The stand may be installed with its base portion parallel to the axis of the tool and locked in such position by the jamb nut 74. The stand may thus be used cooperatively with the handle 130 and torch 140 as a support permitting the entire assembly to conveniently rest upon a flat surface.

The locations of the stand attachment hole 118 and slot 133 are such that when handle 130 is lowered to the plug-projecting position shown in FIGURE 9 and screwed in to tighten it against the body, it is in position to cooperate with the stand 120 in supporting the body. The torch attachment hole 152 may also be in a position such that torch 140 further supports the tool, and also coacts with the stand for this purpose when the handle 130 is raised to retract the plunger, as shown in FIGURES 7 and 8.

It will be apparent that the heating source per se may be varied without departing from the invention, and that although a hose-connected torch is illustrated in FIGURES 7-11, a tank-type torch might be used, in which event the tool body could be supported directly by the tank-type torch, or, alternatively, electrical or other heating agencies might be employed.

In the modified construction shown in FIGURES 12 and 13 the projectable heating portion 215' of the plunger 215 is of truncated conic form, tapering slightly to reduced diameter toward its free end. The opposite heating portion formed by the open right end portion 212' of the bore 212 is correspondingly conically outwardly flared, these heating portions being thus designed to receive flared pipe and fittings, or to form tapered configurations on initially cylindrical parts.

In order to assure effective removal of adhered plastic from the heating parts, a scraping ring 260 is trapped in an inwardly opening peripheral slot in the body near the left end of the bore 212 and is biased inwardly sufficiently to bear against and scrape the heating portion 215' throughout substantially the full length of the latter when the plunger is pulled in to the laterally aligned relation. At the same time a similar scraping ring 261 held in a slot in the plunger 215 near the right end of the latter but biased outwardly against the heating portion 212' of the bore scrapes the portion 212'.

Other portions of the embodiment of FIGURES 12 and 13, corresponding to parts of the previously described embodiment, will require no detailed redescription.

What is claimed is:

1. A heat seal tool of the indicated class including slidably engageable parts movable to aligned and disaligned relationship and having projectable portions for simultaneously heating thermoplastic work or the like to be joined, and which are slidable to cause such parts to rub and to overlap one another to simultaneously displace any adherent material from both such portions.

2. A tool as defined in claim 1 wherein said parts comprise a tubular body open at both ends and a plunger of corresponding length slidable in the body.

3. A tool as defined in claim 1 wherein one of said parts comprises a body having a circular bore extending entirely therethrough and the other part is a plunger slidable in the bore and having an end extensible from the bore to constitute one of said projectable portions, the opposite end of the body having the bore open to define the other projectable portion, and parts carried by the body and plunger and fitted closely enough to the projectable portions of the plunger and body, respectively, to scrape unwanted adherent material from such projectable portions, means for holding the plunger in the projecting position, and means for moving the plunger through the bore to simultaneously scrape the exterior of the projectable portion of the plunger and the interior of the bore of the other projectable portion.

4. A tool as defined in claim 3 wherein said holding means and moving means comprise a handle attached to the plunger and a generally helical cam slot extending through the wall of the body and through which slot the handle slidably extends, the plunger being rotatable in the bore by means of the handle, whereby movement of the handle along the slot rotates and slides the plunger.

5. A tool as defined in claim 3 wherein said holding means and moving means comprise a handle attached to the plunger and a generally helical cam slot extending through the wall of the body and through which slot the handle slidably extends, the plunger being rotatable in the bore by means of the handle, whereby movement of the handle along the slot rotates and slides the plunger, and means for clamping the handle with respect to the body to lock the plunger in position.

6. A tool as defined in claim 3 wherein the body and plunger have flat ends perpendicular to their common axis and are of the same length.

7. A tool as defined in claim 4 wherein the body and plunger have flat ends perpendicular to their common axis and are of the same length, and the handle is threaded into the plunger and overhangs the body whereby the overhanging portion can be tightened against the body by rotating the handle.

8. A tool as defined in claim 2 wherein the body defines an internal bore having a section opening toward one end of the body and into and from which section an operative part of the plunger is slidable, said bore having a coaxial socket section of greater diameter opening toward the opposite end of the body, the plunger including a cleanout part movable in the socket section with sliding movement of the plunger.

9. A tool as defined in claim 2 wherein one of said parts spaced from both ends thereof is recessed to provide a heating chamber inside the tubular body and shielded from both open ends of the body by the extremities of the plunger.

10. A tool as defined in claim 9 including inlet and outlet openings for a heating agent and extending through side wall portions of the body and communicating with said heating chamber.

11. A tool as defined in claim 4 wherein one of said parts spaced from both ends thereof is recessed to provide a heating chamber inside the tubular body, the body having spaced inlet and outlet openings for a heating agent and communicating with the heating chamber through the side walls of the body.

12. A tool as defined in claim 11 wherein the inlet opening includes a fastening part for a detachable heating element.

13. In a tool as defined in claim 5 means for attaching a stand to the body in position to cooperate with the handle in supporting the tool when the plunger is projected.

14. A tool as defined in claim 3 wherein the parts carried by the body and plunger comprise a scraping ring carried by the body and bearing against the projectable portion of the plunger and a scraping ring carried by the plunger and bearing against the bore of the other projectable portion.

15. A tool as defined in claim 14 wherein the projectable portion of the plunger tapers to reduced cross section toward its free end, the bore of the projectable portion of the body tapers toward its open end to increased cross section, the first mentioned scraping ring is biased to contract against the plunger, and the second mentioned scraping ring is biased to expanded against the bore.

References Cited

UNITED STATES PATENTS 2,147,283   2/1939   Covell _____ 165—86
3,147,794   9/1964   Shupe et al. _____ 158—13.6

MEYER PERLIN, Primary Examiner

CHARLES SUKALO, Assistant Examiner

U.S. Cl. X.R.
165—68, 134

UNITED STATES PATENT OFFICE
CERTIFICATE OF CORRECTION

Patent No. 3,494,416                                    February 10, 1970

Lawrence H. Chenault

It is certified that error appears in the above identified patent and that said Letters Patent are hereby corrected as shown below:

Column 2, line 58, after "shown" insert -- fitted --. Column 3, line 66, after "pipe" insert -- and --. Column 4, line 3, "troch" should read -- torch --; lines 57 and 58, cancel "wire or rod having an open triangular lower part, a straight base section". Column 6, line 56, "expanded" should read -- expand --.

Signed and sealed this 29th day of December 1970.

(SEAL)

Attest:

Edward M. Fletcher, Jr.  
Attesting Officer

WILLIAM E. SCHUYLER, JR.  
Commissioner of Patents